United States Patent [19]
Yanagidaira et al.

[11] 3,987,422
[45] Oct. 19, 1976

[54] SYSTEM FOR DETECTING SIGNAL QUALITY OF A PHASE-MODULATED WAVE

[75] Inventors: Hidetaka Yanagidaira, Ohmiya; Katsuhiko Furuya, Tokyo; Sotokichi Shintani, Mitaka, all of Japan

[73] Assignee: Kokusai Denshin Denwa Kabushiki Kaisha, Japan

[22] Filed: Mar. 26, 1974

[21] Appl. No.: 454,950

[30] Foreign Application Priority Data
Mar. 28, 1973 Japan.............................. 48-35187

[52] U.S. Cl. ........................ 340/207 P; 324/83 D; 235/92 PS; 340/347 SY
[51] Int. Cl.² ....................................... G08C 19/16
[58] Field of Search ............ 340/347 AD, 347 SY, 340/207 P; 329/104, 107, 137; 324/82, 83 D; 328/133; 235/92 PS; 325/320, 325

[56] References Cited
UNITED STATES PATENTS

| | | | |
|---|---|---|---|
| 3,553,579 | 1/1971 | Teixeira | 324/83 D |
| 3,579,104 | 5/1971 | Pignard et al. | 324/83 D |
| 3,582,780 | 6/1971 | Hole | 324/83 D |
| 3,663,956 | 5/1972 | Purdy et al. | 324/83 D |
| 3,683,345 | 8/1972 | Faulkes et al. | 235/92 PS X |
| 3,686,490 | 8/1972 | Goldstone | 235/156 |
| 3,727,145 | 4/1973 | Huntsinger | 325/320 X |
| 3,760,270 | 9/1973 | Irvin | 324/83 D |
| 3,764,903 | 10/1973 | Griswold | 324/83 D |
| 3,820,022 | 6/1974 | Watt | 324/83 D |
| 3,843,931 | 10/1974 | Sarkilahti | 329/104 |
| 3,892,956 | 7/1975 | Fuss | 235/156 |

OTHER PUBLICATIONS
Engineering Staff of Analog Devices, "ANALOG-DIGITAL – HANDBOOK," June 1972, pp. 11–16.

Primary Examiner—Thomas J. Sloyan
Attorney, Agent, or Firm—Robert E. Burns; Emmanuel J. Lobato; Bruce L. Adams

[57] ABSTRACT

A system for detecting the signal quality of a phase-modulated wave, in which the phase positions of the signal elements of the digital phase-modulated wave are each detected with respect to a reference phase carrier by a phase detector for developing digital output signals composed of higher digits representing the ideal quantized phase positions of the phase-modulated wave signal elements and at least one lower digit representative of the direction of phase deviation of the signal elements from the ideal quantized phase positions so that the lower digit is taken out as signal quality information of the phase-modulated wave.

7 Claims, 9 Drawing Figures

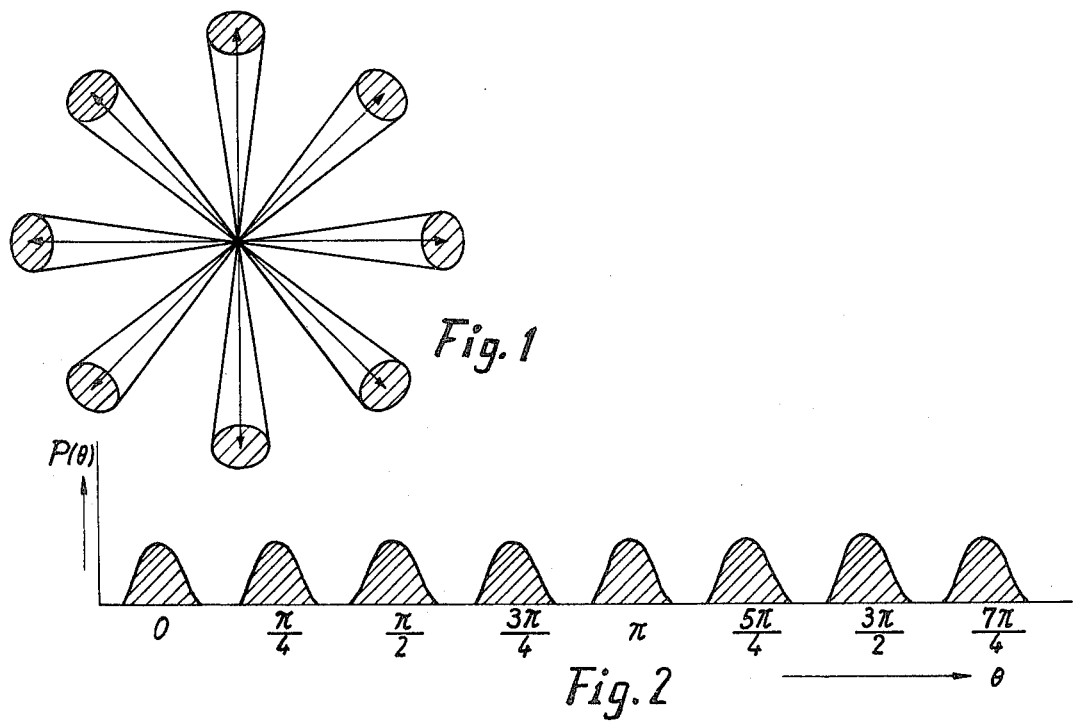
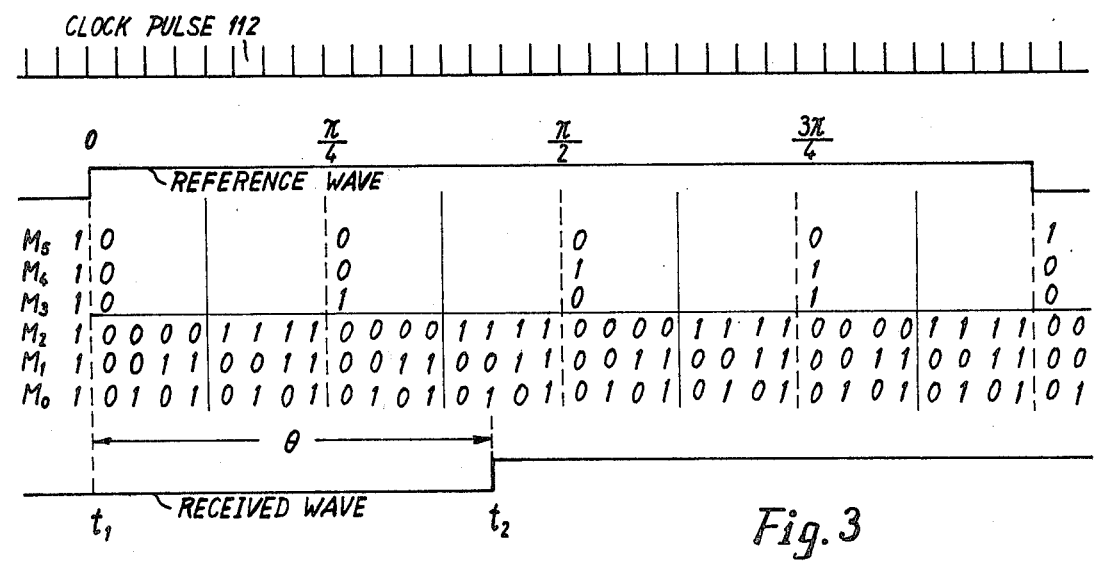

SYSTEM FOR DETECTING SIGNAL QUALITY OF A PHASE-MODULATED WAVE

This invention relates to a system for detecting the signal quality of a digital phase-modulated wave.

In a case of detecting the quality of a digital modulated wave deteriorated by noise and, in particular, interference among signal elements due to its amplitude distortion and its phase distortion, it has heretofore been the practice to employ the principle such that a predetermined, particular signal pattern is transmitted so that a deviation of the transmitted specified signal pattern from a predetermined pattern to be received is measured by means of a meter or a cathode-ray tube. However, since the specified signal pattern is necessary in this method, it is impossible to monitor the signal quality of a communication circuit in the operating condition and low in efficiency.

An object of this invention is to provide a system for detecting the signal quality of a digital phase-modulated wave, which is capable of detecting the signal quality irrespective of whether the sent-out code has a specified pattern or a random pattern and to achieve monitoring the signal quality of a communication circuit in the operating condition.

In accordance with the principle of this invention, the phase positions of a digital phase-modulated input wave are detected by a digital phase detector having the number of output bits composed of higher digits representative of the number of quantum phase positions of the input wave and at least one lower digit so that the lower digit is taken out as signal quality information.

The principle, construction and operations of this invention will be clearly understood from the following detailed description taken in conjunction with the accompanying drawings, in which FIG. 1 is a vector diagram of an eight-phase phase-modulated wave including noise or interference to be measured in accordance with this invention;

FIG. 2 is a diagram showing the phase distribution of the wave shown in FIG. 1;

FIG. 3 is a diagram showing the relationship between the phase positions and binary code units in the case where phase differences are represented by binary numbers;

With reference to FIGS. 1 and 2, the signal quality of a phase-modulated wave to be measured in accordance with this invention will first be described. In FIG. 1, vectors to be directed at eight quantized phase positions indicated by solid line arrows are distributed due to noise or interference in the hatched ranges. FIG. 2 shows the vector distribution in FIG. 1, with the phase being represented on the abscissa. The vectors are distributed at the vicinity of eight positions each of which is an integer multiple of $\pi/4$. The signal quality can be commonly evaluated in accordance with the magnitude of the dispersion of this distribution for all the quantized phase positions.

Illustrated in FIG. 3, is an example of the digital detection of the phase difference between a reference wave and a received wave. Let it be assumed that one period ($2\pi$) of, for example, one eight-phase phase-modulated carrier wave is represented with 6 binary bits. At the phase position 0 of the reference carrier wave, a scale-of-64 counter is started to count clock pulses of a repetition frequency 64-times higher than that of the carrier wave. It is further assumed that transistion instants of the received wave are delayed by a phase angle $\theta$ with respect to the reference wave as shown in FIG. 3. At this time, the count contents of the scale-of-64 counter are 001101 and this six-bit code unit indicates the phase angle $\theta$. In these 6 bits, the three lower digits ($M_2$, $M_1$ and $M_0$) commonly indicate a deviation from the center of distribution groups having ideal positions represented by the three high bits $M_3 - M_5$ (the eight ideal positions, each being an integer multiple of $\pi/4$) as shown in FIG. 2. Namely, a digit $M_2$ represents the direction of deviation, while digits $M_1$ and $M_0$ indicate the magnitude of deviations (when $M_2 = 1$, $M_1$ and $M_0$ are given in the form of complements).

Figure 4:
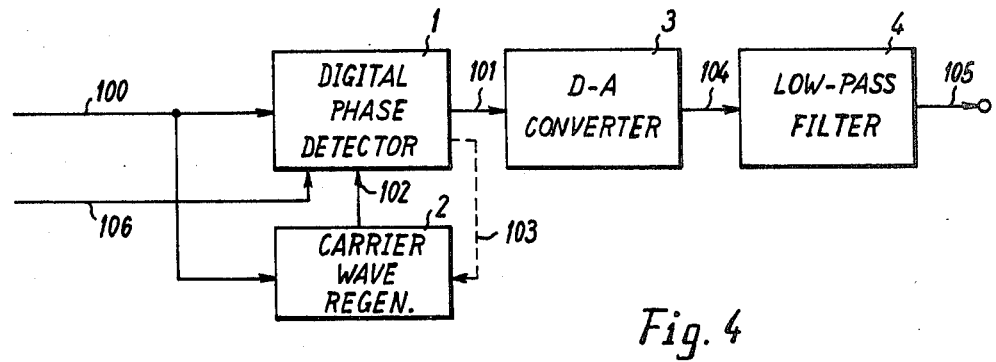
FIG. 4 is a block diagram illustrating an example of this invention.

FIG. 4 illustrates an example of this invention, in which a reference numeral 1 indicates a digital phase detector; 2 designates a carrier wave regenerating circuit; 3 identifies a D-A converter; and 4 represents a low-pass filter. A reference number 100 indicates a received signal. The phase difference between the received signal 100 and a reference carrier wave 102 regenerated by the carrier wave regenerating circuit 2 is detected by the digital phase detector 1. The carrier regeneration is performed by the use of the received wave 100 and, in some cases, by the use of a detector output 103. A reference numeral 101 designates a signal representing only an error of the aforementioned phase difference from the phase of the received wave 100. In the digital indication of the phase position, if a phase range 0 to $2\pi$ is divided into parts $2^n$ to indicate binary information of $n$ channels, the error is indicated by lower digits of the output bits added with at least one lower digit, which is other than higher digits representing the number of quantized modulation phases. The digital signal 101 indicating the error is converted by the D-A converter 3 into an analogue signal and then applied to the low-pass filter 4 to provide a signal 105 reresenting the signal quality of the received wave 100. The signal 105 thus obtained is applied to a volt-meter or a lamp for indicating the signal quality. In this case, if a nonlinear amplifier such as a square-law circuit or the like is inserted after the D-A converter 3 or the low-pass filter 4, the scale of the meter can be modified to provide a nonlinear characteristic suitable for a particular purpose. A reference numeral 106 indicates modulation timing pulses, which are employed for sampling and holding the phase difference.

Figure 5:
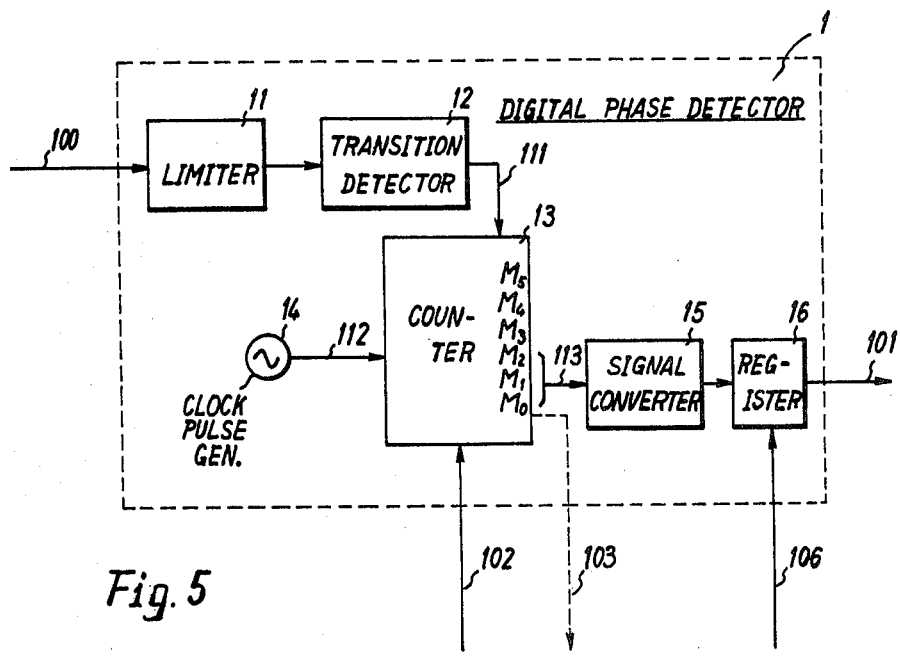
FIG. 5 is a block diagram showing an example of a digital phase detector employed in the example shown in FIG. 4.

FIG. 5 shows an example of the construction of the digital phase detector 1 shown in FIG. 4. A reference numeral 11 designates a hard limiter; 12 represents a transition detector; 13 shows a counter; 14 refers to a clock pulse generator; 15 denotes a signal converter; and 16 designates a register. The received wave 100 is reshaped by the hard limiter 11 into a rectangular wave and its transition instants are detected by the transition detector 12. The counter 13 starts at the transition instant of the reference wave 102, that is, at an instant $t_1$ shown in FIG. 3 to count clock pulses 112 and stops at the transition instant pulse 111 of the received signal at an instant $t_2$ in FIG. 3. In the count contents of counter 13 the lower digits 113 (i.e. three digits $M_o$, $M_1$ and $M_2$) are applied to the signal converter 15 to rectify positive and negative deviations thereof and then converted into code units commonly representative of only the magnitude of the deviation for each of the quantized phase positions. The code units are applied to the register 16 and sampled-and-held in the register 16 by the application of the modulation timing pulses 106 thereto.

Figure 6:
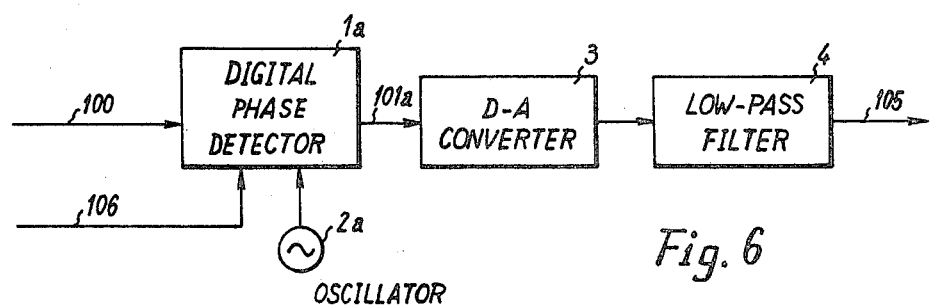
FIG. 6 is a block diagram illustrating another example of this invention.

FIG. 6 illustrates another example of this invention, which employs a self oscillator in place of the carrier regenerating circuit. In FIG. 6, reference numerals 1a, 3 and 4 designate a digital phase detector, a D-A converter and a low-pass filter, respectively, as shown in the example of FIG. 4. A reference numeral 2a indicates an oscillator which generates a frequency very close to the frequency of the carrier wave. In this case, an output 101a from the phase detector 1a is not the phase difference between the received wave and the reference carrier wave but the phase difference between two successive elements of the received wave, unlike the example of FIG. 4. This phase difference is also distributed at the vicinity of the integer multiples of $\pi/4$, as shown in FIG. 2. Accordingly, an output 105, which is obtained by D-A conversion and low-pass filtering of the binary numbers representing the phase difference in the same manner as in the example of FIG. 4, has a voltage value corresponding to the signal quality of the received wave.

Figure 7:
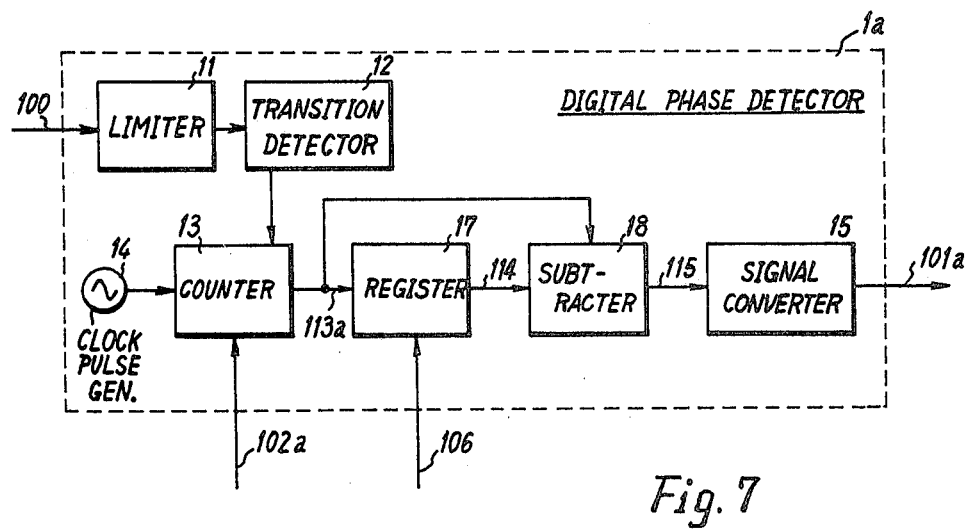
FIG. 7 is a block diagram showing an example of a digital phase detector employed in the example shown in FIG. 6.

FIG. 7 illustrates an example of the construction of the phase detector 1a in the example of FIG. 6. Reference numerals 11, 12, 13, 14 and 15 respectively identify a hard limiter, a transition detector, a counter, a clock pulse generator and a signal converter as shown in the example of FIG. 5. A reference numeral 17 designates a register, and 18 indicates a subtracter. An output 113a of the counter 13 represents the phase difference between the reference carrier wave 102a and the received wave 100 as described with reference to the example of FIG. 5. In this case, however, the reference carrier wave 102a has a phase position independent of the received wave. The phase difference 113a between them is stored in the register 17 to be delayed for a period of time corresponding to one signal element. A signal 113a, which is representative of the phase difference between the next signal element of the received wave and the reference carrier wave, is subtracted in the subtracter 18 from a signal 114 representative of the delayed phase difference. As a result of this, the phase of the reference carrier wave is cancelled so that the result represents the phase difference between successive two signal elements of the received wave. An output 115 is composed of the lower digits of the subtracted result and digitally rectified by the signal converter as described with reference to the example of FIG. 5.

The foregoing description has been given with regard to the case where a phase error represented in a digital form is converted into an analogue signal and then indicated by a meter or another type of indicator. However, it is also possible that the phase error representated in a digital form be indicated in that form.

Figure 8:
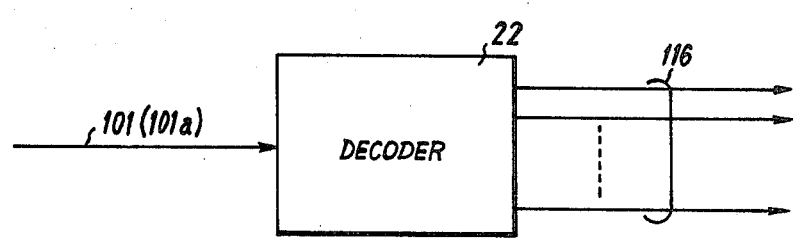
FIGS. 8 and 9 are block diagrams illustrating examples of digital indicators employed for indicating measured results of this invention.

FIG. 8 shows one example of the digital indication, in which a reference numeral 22 designates a decoder. Upon application of the signal 101 in FIG. 4 or 101a in FIG. 6 to the decoder 22, this decoder 22 produces an output at any one of its outputs 116 corresponding to the phase error code unit. The outputs 116 are connected to indicators such as lamps or the like.

Figure 9:
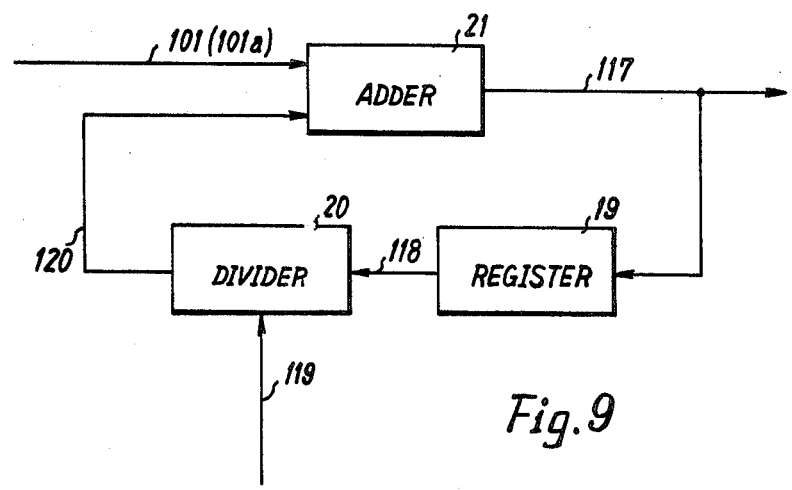

FIG. 9 illustrates another example of digital indication, in which a reference numeral 21 designates an adder; 19 indicates a register; and 20 identifies a divider. These three elements 19, 20 and 21 constitute a digital smoothing circuit. An output 117 of the adder 21 is stored in the register 19 and is thereby delayed. The divider 20 divides an output 118 of the register 19 by an input 119 so that the divided output 120 is added by the adder 21 to the error signal 101 (or 101a). An output 117 of the adder 21 is a smoothed function of the input 101 (101a) and is a code unit equivalent to an analogue output obtained by the application to an analogue CR smoothing circuit, and its smoothing time constant is dependent on the input 119 to the divider 20. The output 117 is applied to a numeral indicator or the like to provide an indication.

As has been described in the foregoing, in the present invention, since a phase signal is represented in a digital form with binary digits and commonly indicated only by the lower digits on a meter, a numeral indicator or the like, it is possible to monitor the signal quality of a phase-modulated wave with a simple device irrespective of any pattern being transmitted. Therefore, the use of the present invention facilitates monitoring of the quality of a communication circuit and adjustment of a manual equalizer therefor.

What we claim is:

1. A system for detecting the signal quality of a phase-modulated wave comprised of signal elements having quantized phases, comprising;
    input terminal means for receiving said phase-modulated wave;
    reference means for generating a reference phase carrier having a frequency substantially the same as the frequency of the phase-modulated wave and a stationary phase position;
    a digital phase detector connected to said input terminal means and said reference means for detecting the phase position of each signal element of said phase-modulated wave with respect to the reference phase of said reference carrier to produce detected code units formed by higher digits and at least one lower digit, the higher digits representing $2^n$ ideal quantized phase positions of the phase-modulated wave signal elements each representative of n channels of binary information, and said at least one lower digit commonly representing the directions of phase deviations of said signal elements from each ideal quantized phase position; and
    output means connected to said digital phase detector receptive of only said at least one lower digit for providing at least one output suitable for indicating phase deviation from the ideal quantized phase positions as the signal quality in response to said at least one lower digit of said detected code units.

2. A system according to claim 1, in which said digital phase detector comprises a limiter for limiting the amplitude of the phase-modulated wave to produce a square wave synchronized with the carrier frequency of the phase-modulated wave, a transition instant detector connected to the limiter for detecting transition instants of the square wave to provide transition instant pulses, a clock pulse generator for generating a pulse train of clock pulses, a counter connected to said transition detector and said clock pulse generator for starting the counting of said clock pulses in response to the transition instants of said reference carrier and stopping said counter in response to said transition instant pulses provided by said transition instant detector, a signal converter connected to the counter for converting said at least one lower digit to code units each indicating the magnitude of phase deviation of the received wave with respect to the reference phase of the reference carrier, and a register connected to said converter for temporarily storing the converted code units to provide said converted code units.

3. A system according to claim 1, in which said digital phase detector comprises a limiter for limiting the amplitude of the phase-modulated wave to produce a square wave synchronized with the carrier frequency of the phase modulated wave, a transition instant detector connected to the limiter for detecting transition instants of the square wave to provide transition instant pulses, a clock pulse generator for generating a pulse train of clock pulses, a counter connected to said transition instant detector and said clockpulse generator for starting the counting of said clock pulses in response to the transition instants of said reference wave and stopping said counting in response to said transition instant pulses provided by said transition instant detector, a register connected to said counter for temporarily storing the counted results of said counter to provide a delayed counted result delayed by the duration of a signal element from each one of said counted results, a subtracter connected to said register and said counter for producing code units each indicating a difference between said delayed counted result and the instant one of said counted results, and a signal converter connected to said subtracter for converting the at least one lower digit of said code units to said converted code units each indicating the magnitude of phase deviation of the received wave with respect to each of the ideal quantized phase positions of said received phase-modulated wave.

4. In a system for detecting the signal quality of a phase-modulated wave comprised of signal elements each having $2^n$ ideal quantized phase positions to transmit $n$ channels of binary information; and of the type including means for generating a reference carrier having a frequency substantially equal to the frequency of the phase-modulated wave, and a digital phase detector for detecting the phase position of each signal element of the phase-modulated wave with respect to the reference carrier; said digital phase detector comprising:

counter means for developing digital signals each having higher bits representative of the ideal quantized phase positions of a respective one of said phase-modulated wave signal elements and having at least one lower bit commonly representative of the direction of phase deviations of said phase-modulated wave signal elements from each of the ideal quantized phase positions; and a signal converter receptive of and responsive to only said at least one lower bit commonly representative of phase error direction for developing an output signal representative of only the magnitude of the phase error with respect to the idealized quantized phase positions.

5. In a system according to claim 4, wherein said counter means develops digital signals having a plurality of lower bits representative of the direction and magnitude of a phase deviation of a respective one of said phase-modulated wave signal elements from each of the ideal quantized phase positions, said plurality of lower bits comprising a bit representative of the direction of said phase deviation and remaining bits representative of the magnitude of said phase deviation, ones of said remaining bits representative of a given magnitude of phase deviation and corresponding to a given direction of phase deviation being complementary to other ones of said remaining bits representative of the given magnitude of phase deviation and corresponding to a direction of phase deviation opposite said given direction.

6. In a system according to claim 4, wherein said counter means includes:
   a transition detector for detecting transitions of said phase modulated wave;
   a clock pulse generator for generating clock pulses; and
   a counter responsive to said reference carrier and enabled by transitions of said reference for counting said clock pulses and responsive to and disabled by transitions of said phase-modulated wave, said counter having means for developing digital output signals representative of the count stored therein.

7. In a system according to claim 6, wherein said counter means further includes:
   a register receptive of certain bits of digital output signals developed by said counter for delaying said certain bits by a period of time equal to the duration of one signal element of said phase-modulated wave;
   a digital subtracter circuit; and
   means for applying the bits delayed by said register and corresponding bits of the output signals developed by said counter to said digital subtracter circuit.

* * * * *